(12) United States Patent
Leijenaar (10) Patent No.: US 6,527,502 B2
(45) Date of Patent: Mar. 4, 2003

(54) SOD COLLECTOR

(76) Inventor: Sijtze Leijenaar, De Werf 6, Gorredijk (NL), 8401 JE ( * ) Notice: Subject to any disclaimer, the term of this patent is extended or adjusted under 35 U.S.C. 154(b) by 14 days.

(21) Appl. No.: 09/758,046

(22) Filed: Jan. 11, 2001

(65) Prior Publication Data

US 2001/0019005 A1 Sep. 6, 2001

(30) Foreign Application Priority Data

Jan. 11, 2000 (NL) .............................................. 1014057

(51) Int. Cl.[7] .......................... A01B 45/00; B65G 37/00; B65G 57/22
(52) U.S. Cl. .................... 414/792; 414/792.1; 414/907; 198/411; 198/427; 172/19; 172/20
(58) Field of Search .............................. 414/792, 792.1, 414/907; 198/411, 401, 427, 429; 172/19, 20

(56) References Cited

U.S. PATENT DOCUMENTS

| 4,828,040 A | 5/1989 | Schumacher |
| 4,903,778 A | 2/1990 | Brouwer et al. |
| 4,966,239 A | 10/1990 | Hutchison |
| 5,064,000 A | 11/1991 | Dover et al. |
| 5,217,078 A | 6/1993 | Zinn |
| 5,230,602 A | 7/1993 | Schouten |
| 5,269,379 A | 12/1993 | Millar et al. |
| RE34,827 E | 1/1995 | Dover et al. |
| 5,609,213 A | 3/1997 | Anderson |
| 5,626,195 A | 5/1997 | Dover |
| 5,697,760 A | 12/1997 | Rosen |

*Primary Examiner*—Douglas Hess
(74) *Attorney, Agent, or Firm*—Burns, Doane, Swecker & Mathis, L.L.P.

(57) ABSTRACT

A sod-collecting apparatus, comprising a collecting platform for supporting juxtaposed rows of coiled sods, a feed conveyor for feeding coiled sods, and a conveyor belt downstream of the feed conveyor, the conveyor belt extending along the collecting platform, wherein the feed conveyor and the conveyor belt are arranged for displacing the coiled sods on the conveyor belt along the collecting platform in a direction parallel to an axial body axis of coiled sods located on the conveyor belt, with a positioning structure for stopping each individual sod on the conveyor belt in at least one predetermined position along the collecting platform.

18 Claims, 9 Drawing Sheets

SOD COLLECTOR

The invention relates to a grass sod-collecting apparatus and to a method for collecting coiled grass sods.

Such apparatus and method are known from U.S. Pat. No. 5,697,760. The sod stacker described herein has a feeder for feeding coiled sods, and a collecting platform. A conveyor belt moves the coiled sods from the feeder up to the collecting platform. The conveyor belt extends in the direction of the collecting platform. If so desired, sods fed via the conveyor belt are rotated one quarter-turn by means of a rotation device, and then passed on to the collecting platform. The collecting platform has a traveling stop against which the sod is pressed. In each case, a next sod is fed and pressed against the sods already present, until a row of sods has been formed. Next, the row is moved onto the collecting platform by means of a slide.

A drawback of this apparatus is that collecting takes place relatively slowly, and is hence not suitable for use in combination with fast sod harvesters. Further, the alignment of the sods depends on the size of the sods, so that a variation in sod size necessarily involves a change in stacking. Further, the sods are necessarily pressed one against the other during collecting, which increases the risk of damage.

The object of the invention is to provide an improved sod-collecting apparatus. It is a further object of the invention to enable displacing the sods along the collecting platform by simpler means, while maintaining a good controllability of the position of the sod in direction of displacement. To this end, the invention provides a sod-collecting apparatus and a method for collecting coiled sods. Because there is provided a positioning structure for stopping each individual sod on the conveyor belt in at least one predetermined position along the collecting platform, the effect achieved is that the sods are aligned for the collecting platform in a fast and effective manner. Also, this no longer requires mechanical contact between the sods, so that the risk of damage to the sods is reduced considerably. Further, the dimension of the sod, in particular the diameter of the coiled sod, influences the stacking result only to a highly reduced extent, if at all. By displacing the sods in axial direction along the collecting platform, the sods are little inclined to roll, even in the case of substantial accelerations and decelerations. Further, the position of the sods in conveying direction can be controlled more effectively, because the end face can be relatively flat and the width of the sod—unlike the diameter—does not depend on the depth settings of the sod cutter, the harvesting circumstances and the soil condition.

The invention will be farther explained on the basis of a detailed description of a number of exemplary embodiments of the invention and with reference to the drawing. In this drawing.

Figure 1:
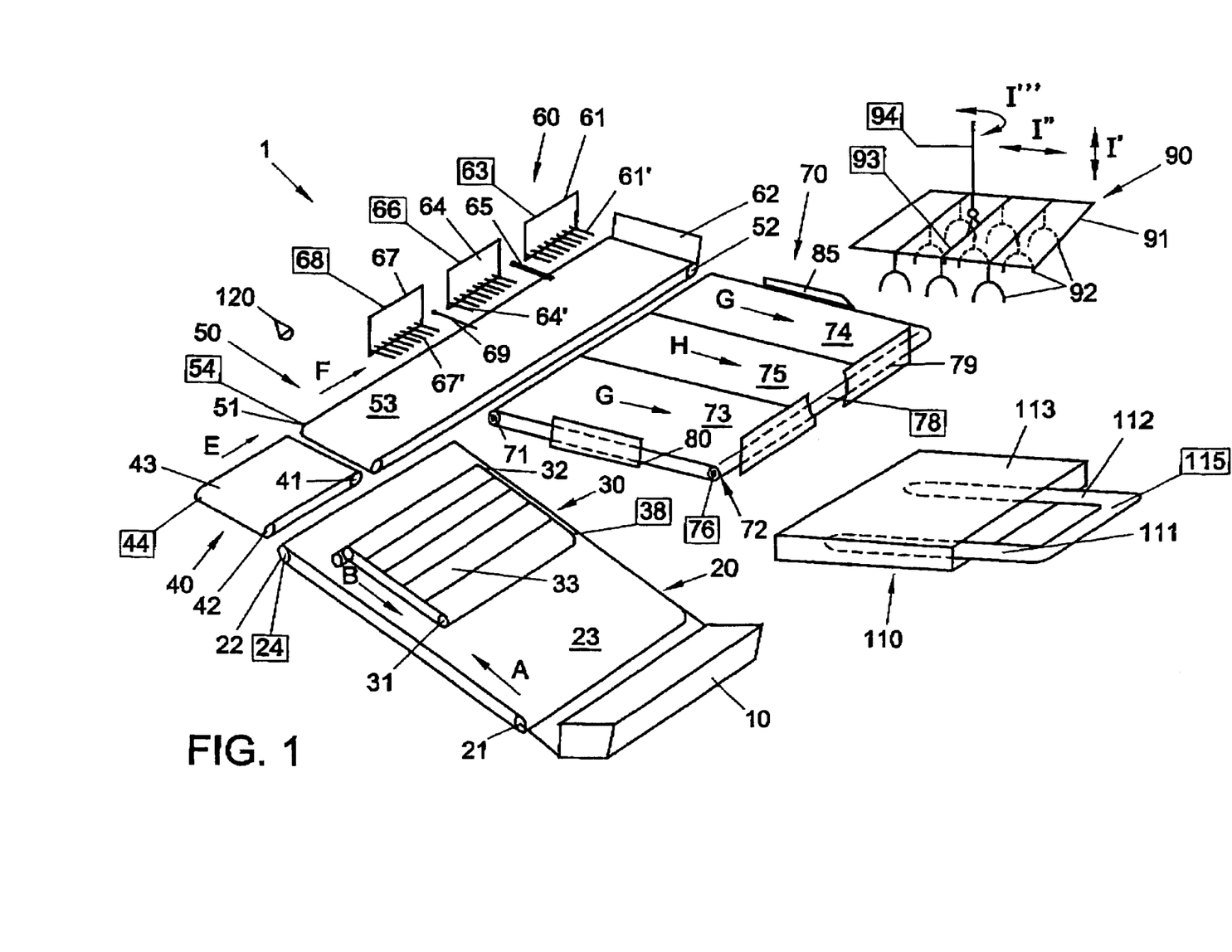
FIG. 1 shows, in perspective, the schematic structure of an apparatus according to the invention.

FIG. 1 shows the structure of a sod-collecting apparatus according to the invention which presently forms the most preferred exemplary embodiment. The collecting apparatus 1 has a sod cutter head 10 designed for cutting two parallel strips of sod from a lawn. Such cutter head is known from practice, so that a detailed description of the cutter head 10 is dispensed with, for brevity's sake Provided behind the cutter head 10 is a lifting belt 20 having a first roller 21 and a second roller 22, stretching an endless bolt 23. The rollers 21, 22 are connected to a drive mechanism 24 whereby the top side of the belt 23 can be moved in a lifting direction indicated by the arrow A in FIG. 1.

Located downstream above the lifting belt 20 is a coiling device 30. The coiling device 30 is arranged for coiling strips of sod fed by the lifting belt 20. The coiling device 30 comprises a first shaft 31 and a second shaft 32 stretching an endless belt 33. The shafts 31, 32 are connected to a drive mechanism 38, whereby the belt 33 can be moved such that the side of the belt 38 facing the belt 23 can be moved in the direction indicated by the arrow B in FIG. 1, i.e. against the lifting direction. At its end that is downstream in lifting direction A, the coiling device 30 comprises a cam shaft 84 parallel to the shaft 32, of which cam shaft an outer surface is provided with several radially projecting cams 35. The cam shaft 34 is connected to a drive mechanism, not shown, for rotating the cam shaft 34 in a rotational sense indicated by an arrow C in FIG. 2. By means of a framepart 36, the cam shaft 34 is fixedly connected to the shaft 32. By means of a framepart 37, the shaft 31 is rotatably connected to a frame of the apparatus 1. Downstream in lifting direction A, beyond the cam shaft 34, the coiling device 30 comprises a bar rack 39 which is rotatably connected to a frame of the apparatus 1 by means of a framepart 39'. The bar rack 39 can be swiveled in a direction indicated by an arrow A' in FIG. 3.

Figure 2:
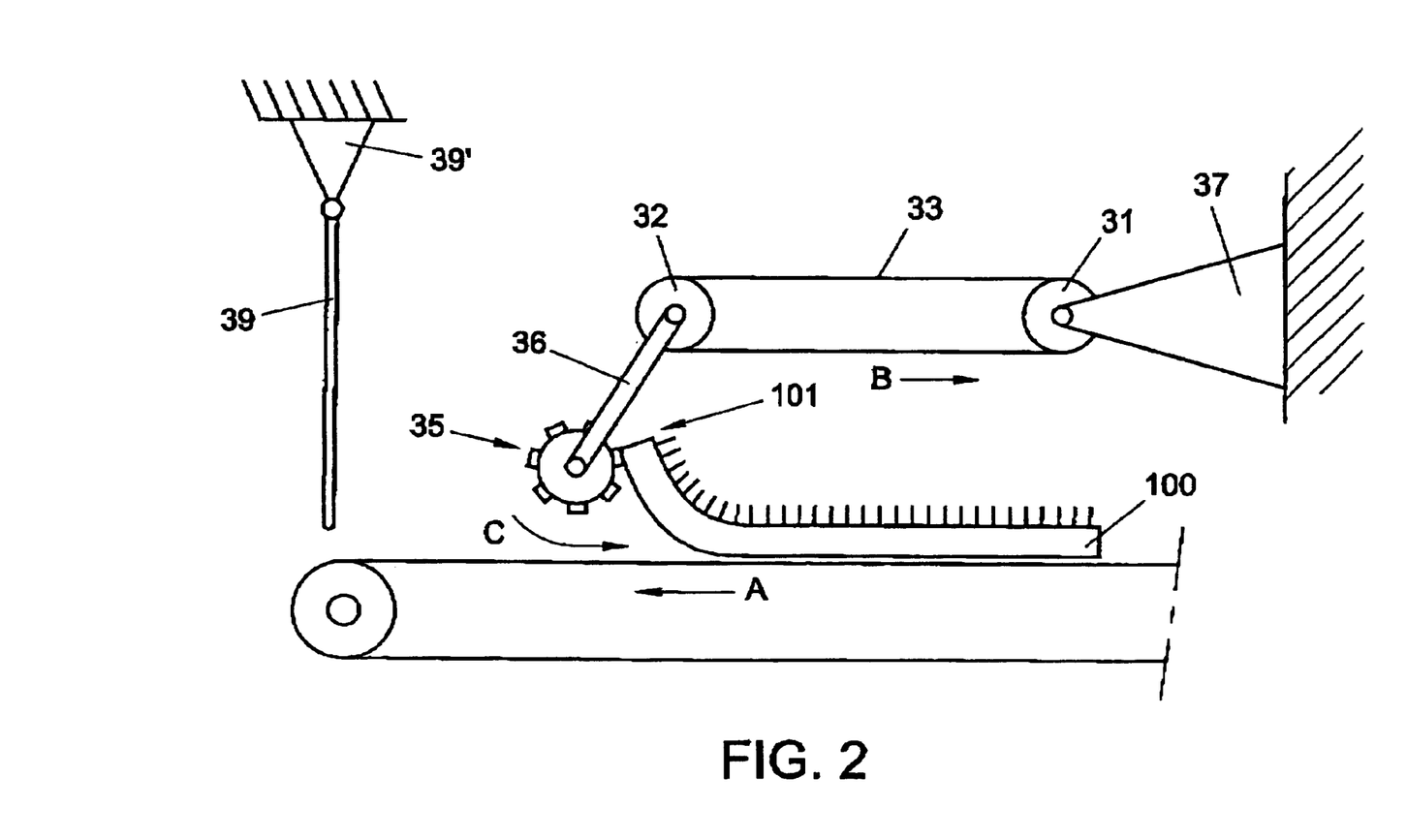
FIGS. 2 and 3 are side elevations of a portion of the apparatus according to FIG. 1, in operative condition.
Figure 3:
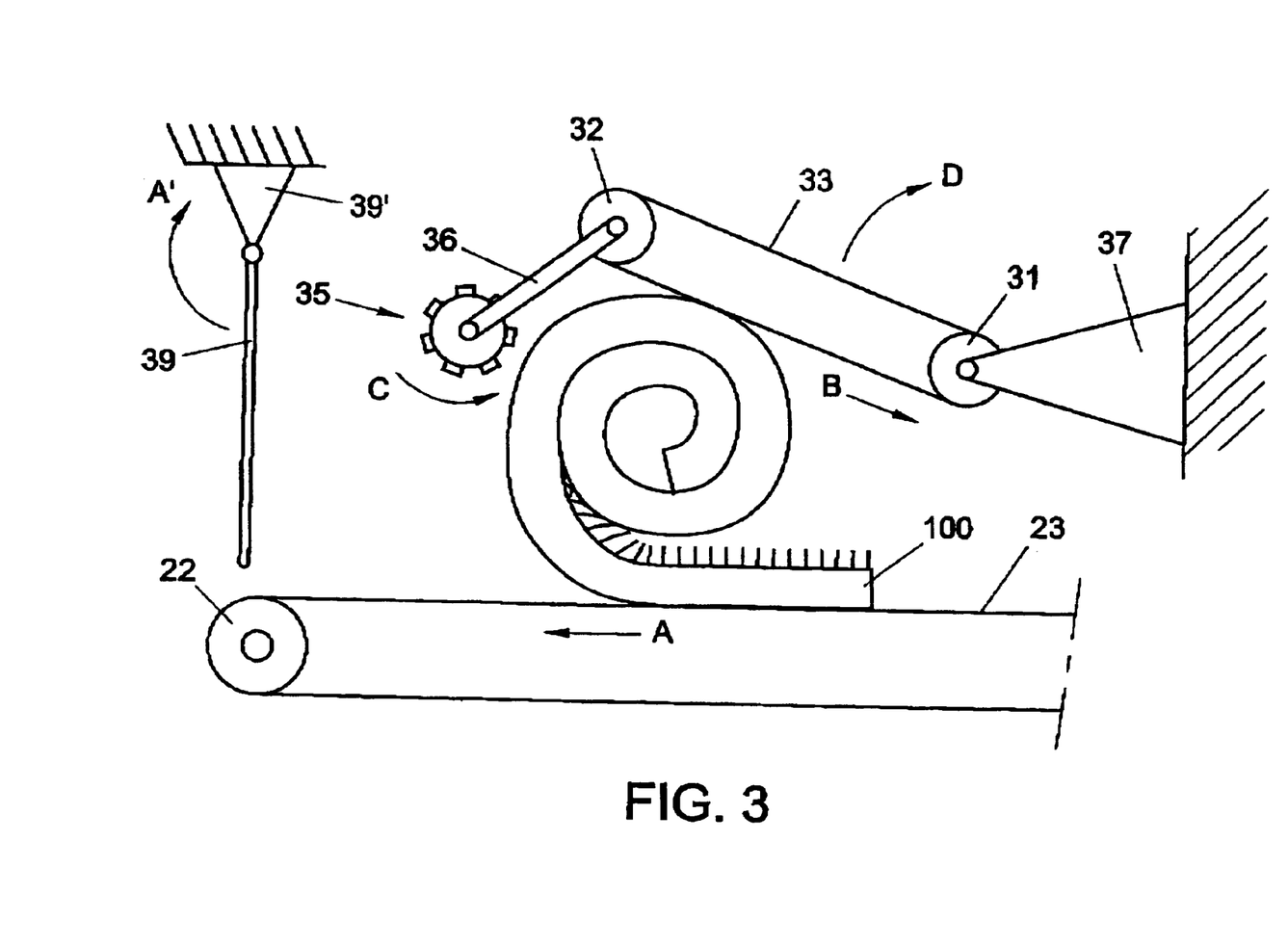

A sod 100, cut by the cutter head 10, is moved in the direction A by the belt 23. When a leading end 101 of the sod 100 contacts the cam shaft 84, the end, as shown in FIG. 2, will be engaged by the cams 35 of the cam shaft 34 and bent towards the belt 33. When the end 101 touches the belt 33, the sod 100 is engaged by the belt 33 and advanced, so the sod 100 is rolled up, as shown in FIG. 3, while the belt 23 keeps running in the direction A During rolling up, the diameter of the coiled sod increases, with the coiling device 30 pivoting about the framepart 37, in the direction indicated by the arrow D in FIG. 3. When the sod 100 has been rolled up for the larger part, but not yet entirely, as in the condition shown in FIG. 3, the belt 33 is stopped. The partially coiled sod 100 is subsequently conveyed further by the belt 23, away from the belt 33, up to the pivotable bar rack 39. After the sod 100 has come outside the reach of the belt 33, the belt 33 is pivoted back into the starting position about the shaft 31, as shown in FIG. 2. The sod 100 is fully rolled up against the bar rack 39. After the sod 100 has been rolled up entirely, the bar rack 39 is pivoted away in the direction indicated by the arrow A' in FIG. 3, whereupon the roll thus formed can be conveyed further by the belt 23 in the direction A. After the roll 100 has passed the bar rack 39, the bat rack 89 is moved back into the starting position as shown in FIG. 2. Preferably, the speed of the belt 33 is higher than the speed of the belt 23, to speed up the coiling operation.

In a structural variant of the invention not shown, the coiling device 30 comprises a detector which determines the swiveled-out position of the coiling device 30 relative to the framepart 37, and, upon reaching a given position corresponding to the above-described partially coiled condition of the sod, switches off the drive mechanism 38 of the belt 33. This further improves the speed of rolling up and discharging the sod.

Adjacent the downstream end of the lifting belt 20, the apparatus 1 comprises a conveyor track 40. The conveyor track 40 comprises a first roller 41 and a second roller 42 which stretch an endless belt 43. The two rollers 41, 42 are connected to a drive mechanism 44 arranged for driving the belt 43 such that the top side of the belt 43 moves in the direction indicated by the arrow E. The direction E is transverse to the lifting direction A.

Located at the downstream end of the conveyor track 40 is a conveyor track 50. The conveyor track 50 comprises a first roller 51 and a second roller 52 which stretch an endless belt 53. The two rollers 51, 62 are connected to a drive mechanism 54 arranged for driving the belt 53 such that the top side of the belt 53 moves in the direction indicated by the arrow F. In this example, the direction F is identical to the direction E.

Located next to the conveyor track 50 is a collecting platform 70. The collecting platform 70 has a substantially rectangular shape. The collecting platform 70 comprises a first roller 71 and a second roller 72 which stretch two endless belts 73, 74. The belts 78, 74 are spaced apart, the top faces of the belts 73, 74 being co-planar. Between the belts 73, 74, there is provided an endless center belt 75 stretched by rollers, not shown, provided with a drive mechanism 78. The top face of the center belt 75 is located below the plane of the belts 73, 74. The two rollers 71, 72 are connected to a drive mechanism arranged for driving the belts 73, 74 such that the top sides of the belts 78, 74 move in the direction indicated by the arrow G. The direction G is transverse to the conveying direction F of the belt 50. The belt 76 can move independently of the belts 73, 74 in the direction H, which is parallel to the direction G.

At a downstream edge, the platform 70 is provided with a stop 79 extending over substantially the entire downstream edge of the platform 70. At the outer edges of the platform 70 adjoining the belts 73, 74, press-on members 80, 85 respectively are located. These press-on members 80, 85 likewise extend over substantially the entire relevant lateral edges of the platform 70 and comprise pressing means, not shown, capable of displacing the press-on members 80, 85 from a retracted position into a press-on position, in the direction indicated by the arrows K, K' in FIG. 4.

Located next to the conveyor track 50, at the collecting platform, is a slide-off device 60. The slide-off device 60 comprises a first slide 61 located at a downstream end of the belt 53, on the side of the belt 53 remote from the collecting platform 70, at the conveyor track 74. The slide 61 is connected to a drive mechanism 63 arranged for displacing the slide 61 in a direction J', transverse to the conveying direction F of the conveyor track 50. A contact face of the slide 61 facing the conveyor track is provided with several projecting pins 61'. Located next to the first slide 61 on an upstream side is a second slide 64. The second slide 64 is connected to a drive mechanism 66 arranged for displacing the slide 64 in a direction J" transverse to the conveying direction F of the conveyor track 50, and positioned at the conveyor track 75. A contact face of the slide 64 facing the conveyor track comprises several projecting pins 64'. Adjacent a downstream end, the slide 64 comprises a stop 65, connected to the drive mechanism 66 and movable, via the drive mechanism 66, from a retracted position into a projecting stop position. In the stop position, the stop 65 is located above the conveyor belt 53.

Located next to the second slide 64, on an upstream side of the conveying direction F, is a third slide 67, disposed at the conveyor belt 75. The third slide 67 is connected to a drive mechanism 68 arranged for displacing the third slide 67 in a direction J'" transverse to the conveying direction F of the 16 conveyor track 50. A contact face of the slide 67 facing the conveyor track is provided with several projecting pins 67'. Adjacent a downstream end, the slide 67 comprises a stop 69 connected to the drive mechanism 68 and movable, via the drive mechanism 68, between a retracted position and a projecting stop position. In the stop position, the stop 69 is located above the conveyor belt 53.

Located adjacent the upstream side of the slide 67 is an optical sensor 120 arranged for detecting coiled sods present on the conveyor track 50.

The apparatus 1 further comprises a sod lifter 90. According to this example, the sod lifter 90 comprises a frame 91 having nine grippers 92. By a drive mechanism 93, the grippers 92 can be moved from an open position into an engaging position. In the engaging position, the grippers can engage a coiled sod. By means of a drive mechanism 94 and guides (not shown), the frame 91 is displaceable relative to the collecting platform 70, in vertical direction (indicated by arrow I'), in horizontal direction (indicated by arrow I"), and for rotation about the center of frame 91 (indicated by arrow I'"). In operation, the drive mechanism 94 moves the sod lifter 90 to a position above the collecting platform 70, with the grippers 92 in open position; next, the drive mechanism 93 brings the grippers 92 into their engaging position, wherein the grippers 92 engage coiled sods present on the collecting platform 70, to subsequently move the sod lifter 90 away from the collecting platform 70, taking along the sods clamped in the grippers 92.

The apparatus 1 further comprises a pallet holder 110 for receiving pallets onto which the sods are loaded. The pallet holder 110 is provided with carriers 111, 112 for in each case picking up a next pallet 113. For unloading filled pallets (preferably at a distance from the path of the sod collector), techniques known per se can be used.

Figure 5:
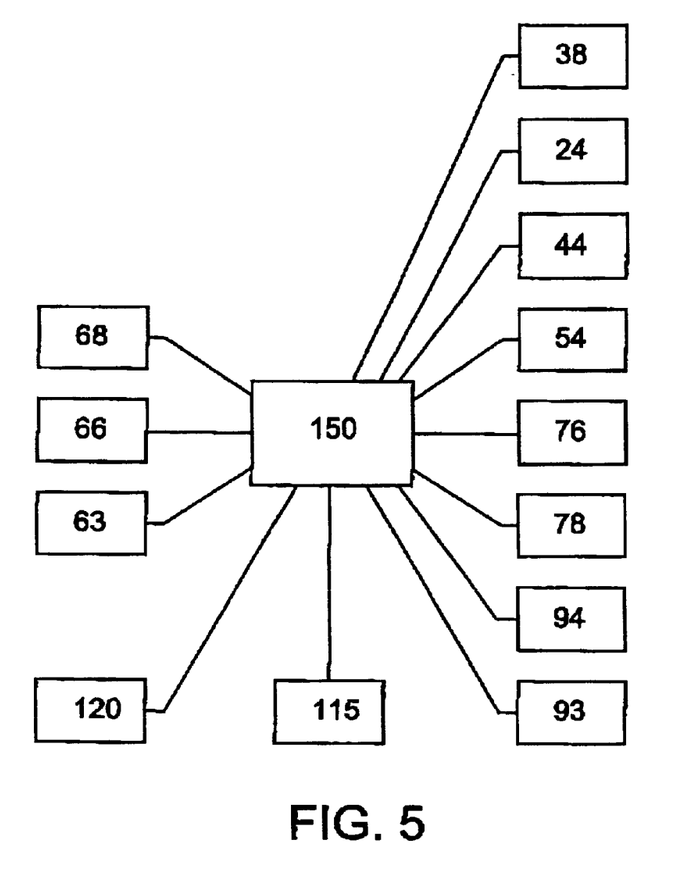
FIG. 5 is a schematic outline of a control system of the apparatus according to the invention.

The respective drive mechanisms 24, 38, 44, 54, 63, 66, 68, 76, 78, 93, 94, 115, and the sensor 120, are connected to a control unit 150. The control unit 150 is arranged for controlling the processing operation of the stacker according to the invention.

Hereinafter, the operation of the sod stacker 1 according to the invention will be specified.

In operation, the cutter head 10 cuts two parallel strips of sod from a lawn. Via the lifting device, these strips are fed to the coiling device 30. In the manner described hereinabove, the coiling device 30 rolls up the two sods. Next, the two coiled sods are further conveyed in the direction of arrow A. One coiled sod arrives on belt 40. The other coiled sod arrives on belt 50. Subsequently, both belts 40, 50 convey in the direction E, with the speed of the belt 40 being lower than the speed of the belt 50. The coiled sod that arrived on the belt 50 subsequently passes the optical sensor 120. The optical sensor 120 transmits a signal to the control 150, which then indicates the position to which the coiled sod is to be displaced by the belt 50. In this example, three aligning positions are possible. The first position is defined by the stop 62, the second position by the stop 65 and the third position by the stop 69.

According to this example, the belts 40 and 50 are designed as smooth belts. These belts are inexpensive, little susceptible to fouling and easy to clean. Since the coiled sods on the belts 40 and 50 are displaced in a direction parallel to their axial body axis, the sods cannot roll in the conveying direction, also in the case of strong acceleration and deceleration, so that the transport of the sods is not adversely affected by the smooth conveyor belts. Further, the end faces of the sods form a more accurate indication of the position of the sod than the circumferential face which, depending on coiling tightness, thickness of the sod and the height at which it is detected, can lie at a substantially varying horizontal distance from the center line.

To move a next coiled sod into the first aligning position, the control 150 brings the stops 65 and 69 into their retracted positions, so that the sod can be carried along by the conveyor track 50 without any obstruction, until an end face thereof strikes the first stop 62.

To move a next coiled sod into the second aligning position, the control 150 brings the stop 65 into its lowered position. As a result, that sod is carried along by the conveyor track 50 without any obstruction until an end face thereof strikes the second stop 65.

To move a next coiled sod into the third aligning position, the control 150 brings the stop 69 into its lowered position. As a result, the sod is carried along by the conveyor track 50 until an end face thereof strikes the third stop 69.

Having arrived at their predetermined aligning positions, the sods are subsequently displaced from the belt 50 to the collecting platform 70 by the slide-off device 60. To this end, the control 150 activates the slides associated with the given aligning positions. For the first, second and third aligning positions, these are the slides 61, 64, 67 respectively. Accordingly, the relevant slide 61, 64, 67 is moved by the relevant control 63, 66, 68 in the direction J', J", J'" respectively, with the projecting pins 61', 64', 67' engaging the coiled sod and the slide 61, 64, 67 displacing the coiled sod onto the collecting platform 70. Subsequently, the coiled sod is displaced by the belt 74, 75, 73 respectively in the direction H, G, into abutment against the stop 79 or against sods collected on the collecting platform earlier on.

Since the slides are provided with the projecting pins which prick into the sods during displacement of those sods, the effect achieved is that during displacement, the coiled sods do not rotate or roll about their axial body axes. This prevents the sods from being unrolled and thus disturbing the collecting process. According to the invention, it is preferred that the belts 74, 75, 73 be designed as smooth conveyor belts; such belts are inexpensive and little susceptible to fouling and easy to clean.

Figure 9:
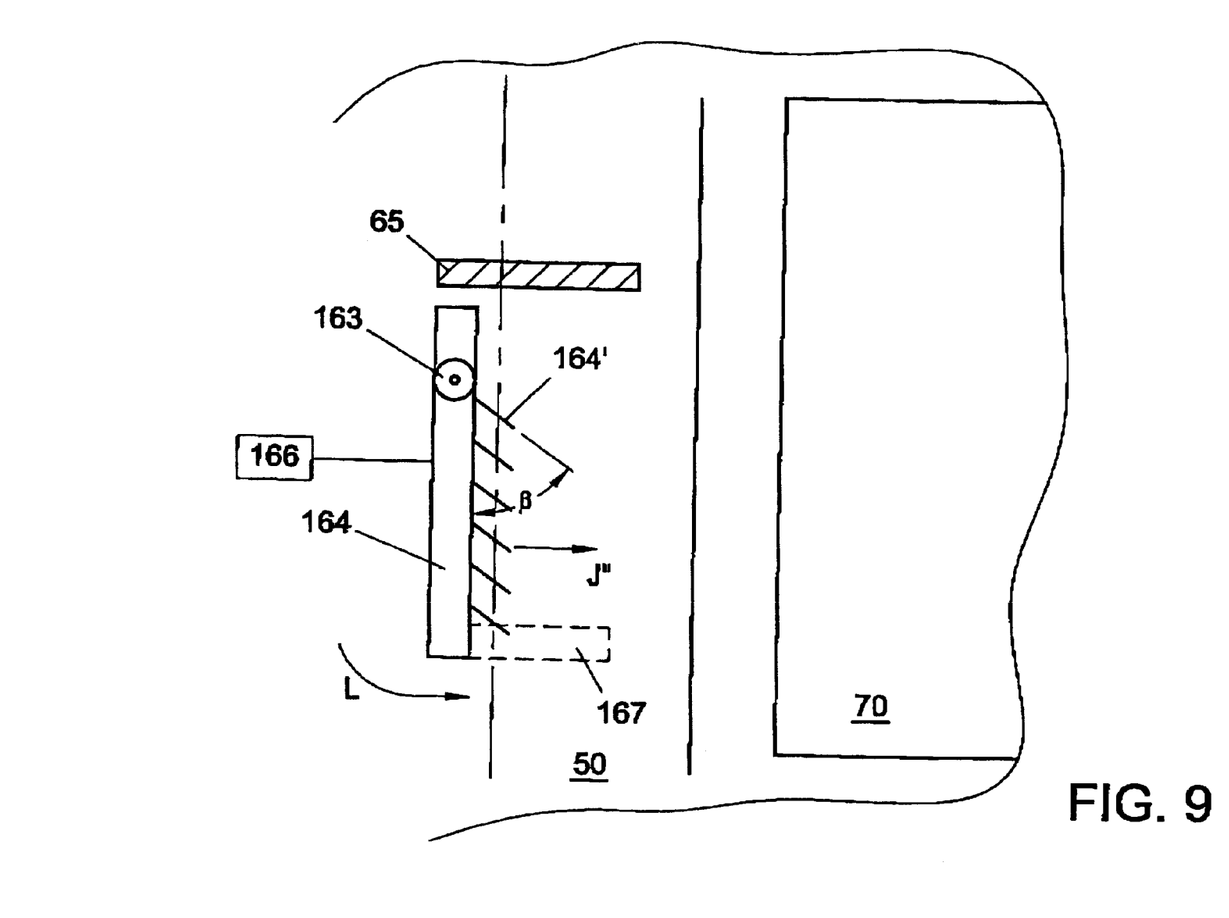
FIG. 9 is a top plan view of a portion of a further practical variant of an apparatus according to the invention.

FIG. 9 shows a structural variant of a slide 164 according to the invention The slide 164 is arranged along the conveyor track 50 in accordance with the slide 64 from the previous example. The slide 164 is provided with several projecting pins 164' placed at an angle β to a contact face of the slide 164, The slide 14 is connected to a drive mechanism 166 capable of moving the slide 164 in a direction J'" in accordance with the slide 64. In addition, the drive mechanism 166 is arranged for rotating the slide 164 about a point of rotation 163, in a direction indicated by an arrow L. At its upstream side, the slide 164 comprises a clamping arm 167 arranged for engaging a coiled sod located in front of the slide 164 and clamping it against the slide 164. In operation, the slide 164 can displace a coiled sod, aligned in front of the slide 164 by means of the stop 65, to the collecting platform 70 by displacing the slide 164 in the direction J", in accordance with the manner described hereinabove. If so desired, during the drive 166, the slide 164 can also rotate in the direction L. Thus, the coiled sod is rotated 90° about a body axis perpendicular to the axial body axis. As a result, the sod is moved onto the collecting platform with its axial axis in the direction J". During the rotation, the clamping arm 167 clamps the sod against the slide 164; thus, the chance of the sod being rotated not fully 90° is reduced considerably.

Figure 8A:
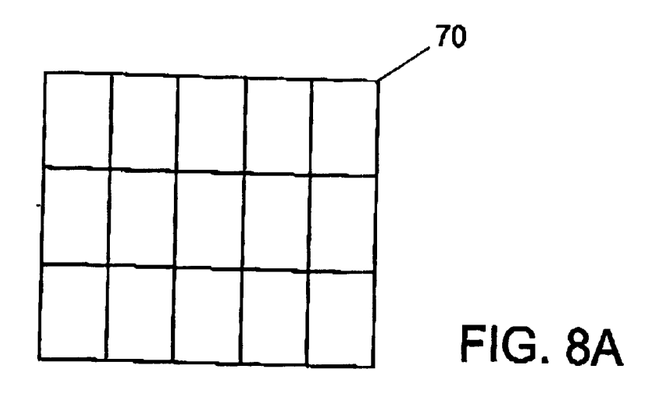
FIGS. 8A–C are top plan views of different collecting patterns on the collecting platform.
Figure 8B:
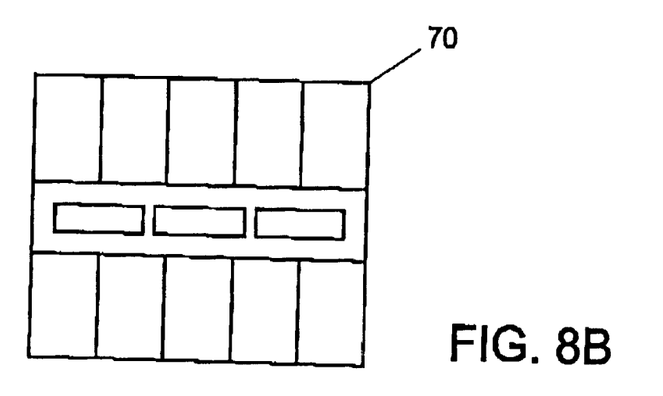
Figure 8C:
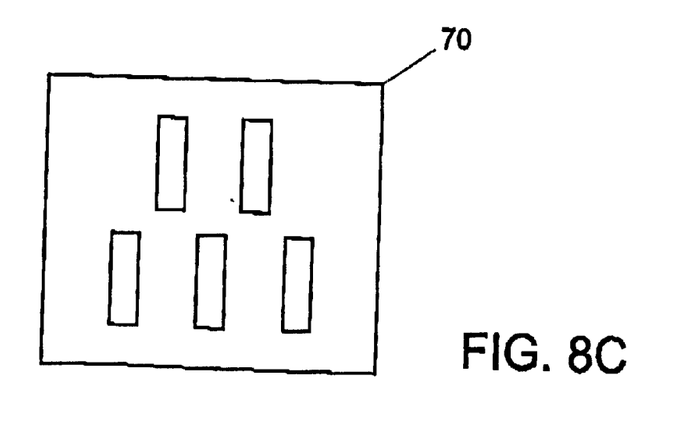

This has the advantage that the coiled sods can be laid on the collecting platform in different collecting patterns as desired. FIGS. 8A–C represent a few possible collecting patterns, in each case showing a top plan view of the collecting platform 70 with coiled sods positioned thereon. The control 150 can be set by a user for bringing the sods onto the collecting platform 70 in a specific pattern.

When a coiled sod has been displaced to the collecting platform 70 according to the manner described hereinabove, the sod is displaced by the movement of the relevant belt 73, 74, 75 in the direction G, H, up to the stop 79, or, if one or more sods have already been fed, up to the sods already collected. Thus, the sods on the collecting platform 70 are collected in rows.

Figure 4:
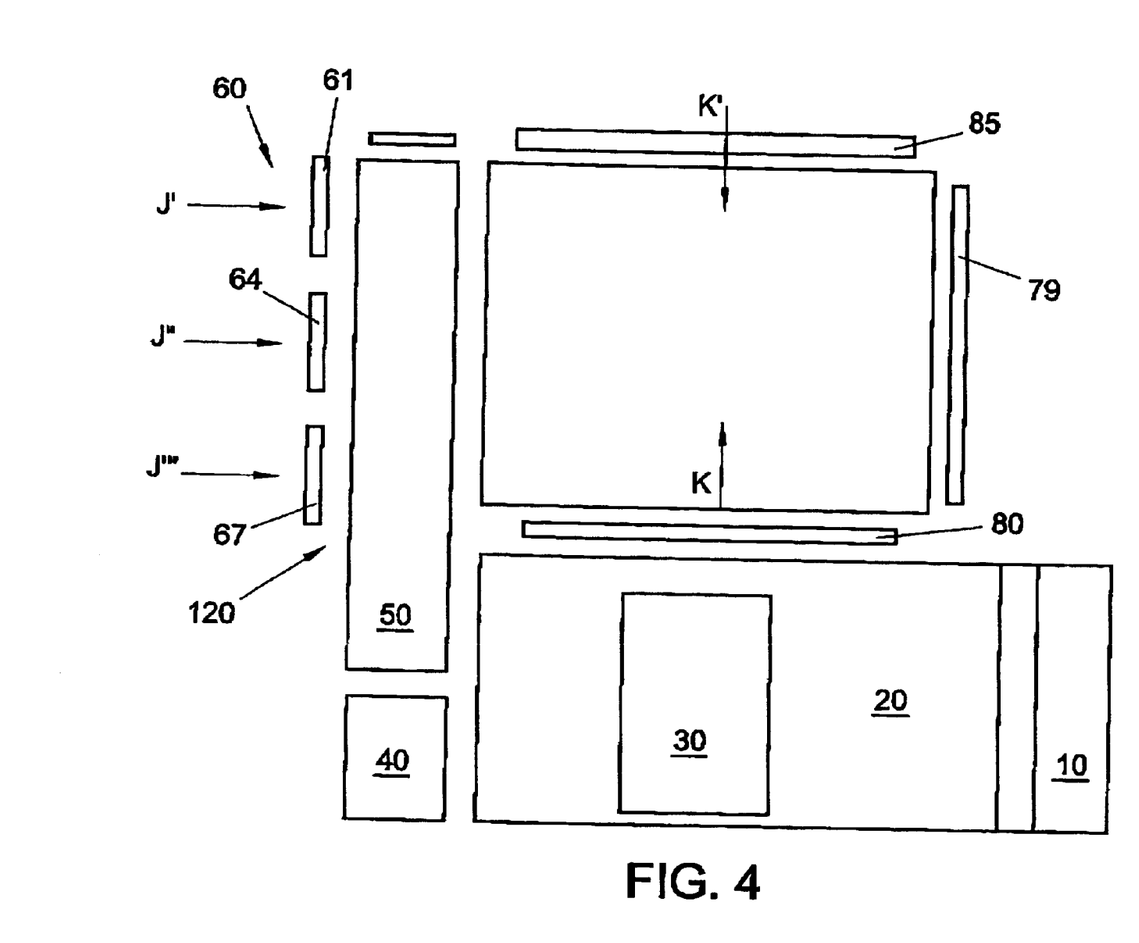
FIG. 4 shows a layout of the apparatus according to FIG. 1.

When the collecting platform 70 has been filled with sods, the control 150 sets the compression members 80, 85 into operation. The compression members 80, 85 compress the sods in the direction K, K', as a result of which possible interspaces between the sods are reduced relative to each other.

After the sods collected on the collecting platform 70 have been compressed, the control 150 moves the lifting head 90 to a position above the collecting platform, by means of the drive mechanism 94. By means of the drive mechanism 98, the grippers 92 are moved into the open position, whereupon the lifting head 90 lowers to a position adjacent the collected sods. Next, the grippers 92 are moved into the closed position, with each gripper engaging a sod. After this, the lifting head 90, including the engaged sods, is lifted and displaced to a position above the pallet 113, Here, the sods are placed on the pallet 113 by the gripper 92 and released. In a similar manner, a next layer of sods is fed, while, if so desired, the orientation of the sods can be rotated 90° by rotating the lifting head 90 in the direction I'". When the pallet 113 has been fully loaded, the device 110 can discharge the pallet.

Figure 6:
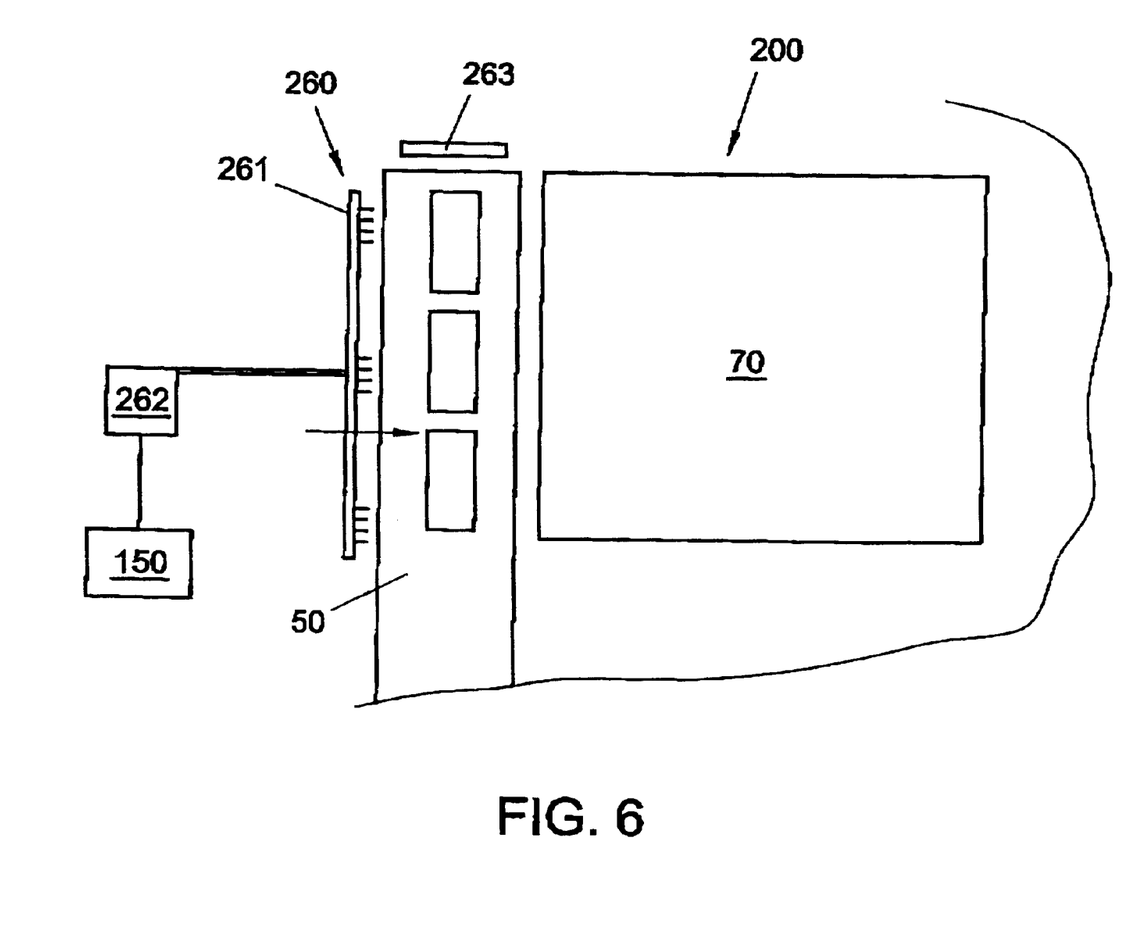
FIG. 6 is a top plan view of a portion of another embodiment according to FIG. 1.

FIG. 6 shows a schematic top plan view of a portion of a structural variant. The collecting apparatus 200 differs from the collecting apparatus 1 from the first exemplary embodiment through the design of the displacing device 260, and is identical as far as the other parts are concerned, so that, for the sake of brevity, the foregoing is referred to for a detailed description.

The displacement device 260 comprises a single slide 261 arranged along the conveyor track 50. The slide 261 is connected to a drive mechanism 262 capable of displacing the slide 261 in a direction transverse to the conveyor track 50. The drive mechanism 262 is connected to the control 150. Provided at the downstream end of the conveyor track 50 is a stop 263. In operation, coiled sods are passed along the collecting platform 70 by the conveyor track 50 in the manner described hereinabove. After a plurality of sods have been moved with their end faces into mutual abutment before the slide 261, the drive mechanism 262 is controlled by the control 261 to displace the slide 261 in the direction of the collecting platform 70. This involves displacement of the row of sods from the conveyor track 50 to the collecting platform 70.

An advantage of this embodiment is that the construction is simpler.

Figure 7:
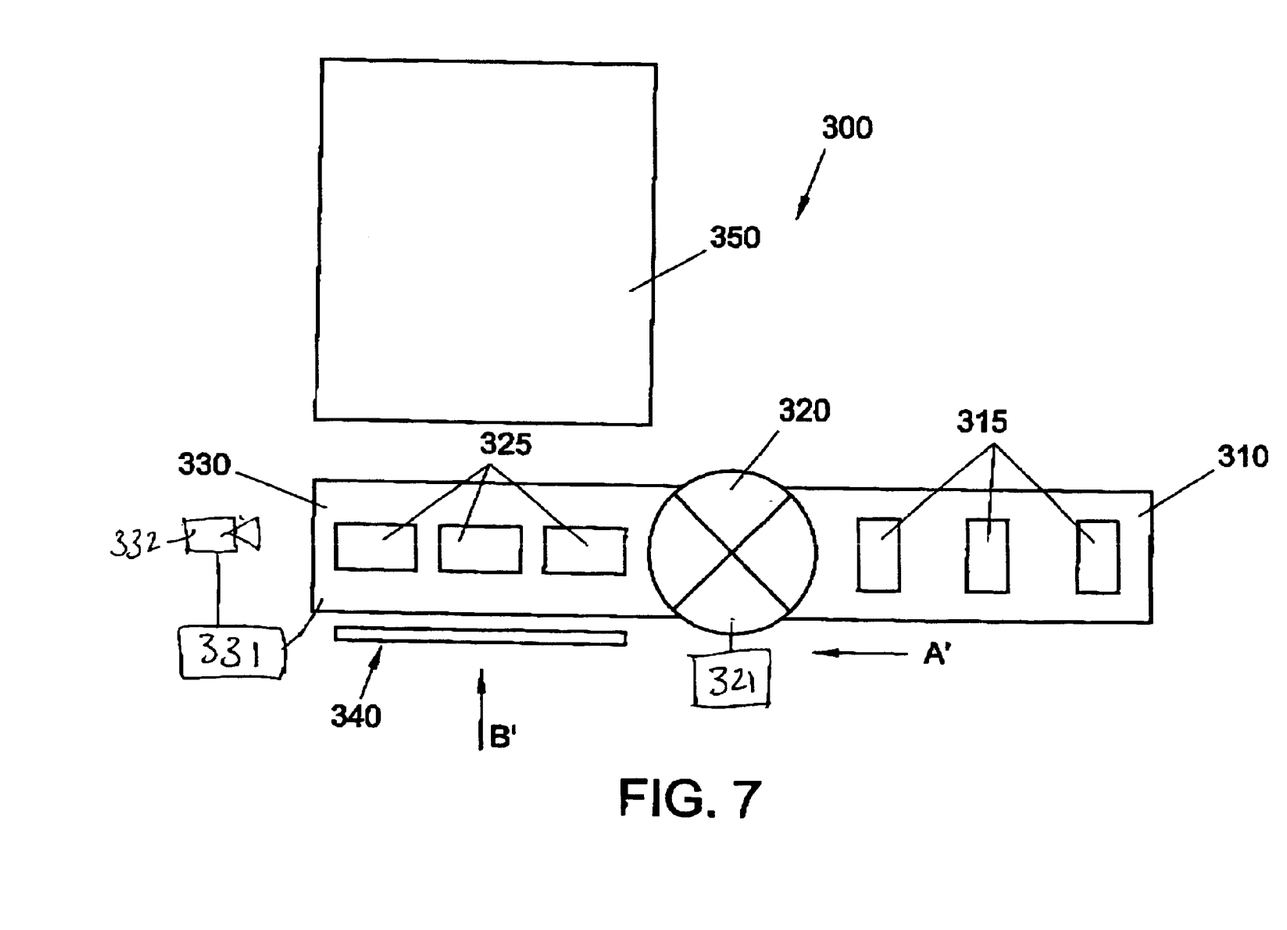
FIG. 7 is a top plan view of yet another embodiment of an apparatus according to the invention.

FIG. 7 shows a schematic top plan view of a further structural variant. The collecting apparatus 300 comprises a feed conveyor 310 which conveys coiled sods 315 in a feed direction A'. The orientation of the coiled sods on the feed conveyor is such that the axial body axis of the sods 315 is in each case directed transversely to the conveying direction A'. The feed conveyor 310 feeds the sods 315 to a rotation station 320 which rotates the sods 315 in each case such that the axial body axis of the sod 315 is aligned with the conveying direction A'. In this orientation, the rotation station 320 passes the now rotated sods on to a conveyor track 330 extending along the collecting platform 350. Although in this example, the feed conveyor 310 is in line with the conveyor track 330, the invention also provides other arrangements of the feed conveyor, and in particular an arrangement wherein the feed conveyor extends along the collecting platform, according to the arrangement shown in the first exemplary embodiment.

The rotation station 320 comprises a control 331 whereby it can be indicated, per sod fed, whether or not the sod has to be rotated. This enables making various stacking patterns, wherein the orientation (i.e. rotated on not rotated) of the individual sods can be controlled per row. The conveyor track 330 conveys the sods 325 further, up to a specific aligning position along the collecting platform 350. To this end, the conveyor track 380 is provided with a control 321 arranged for each time causing the belt to run on through a predetermined length. The length through which the belt should run on per sod depends on the desired stacking pattern. Such control has the advantage that a good alignment can be obtained for each individual sod independently of the dimension of the sod, in particular the diameter of the coiled sod. The control 331 of the conveyor belt 330 may be provided with detectors 332, such as, for instance, optical or acoustic sensors, whereby the control can detect the position of the sods on the belt. Partly on the basis of the detection results, the control 331 controls the conveyor belt 330; this allows positioning the rolls with increased precision in that corrections can be made for unforeseen factors such as, for instance, slip between the belt and the sod. The collecting device comprises a slide 340 arranged for displacing coiled sods that are located in an aligning position on the conveyor track 330, in a direction B' transverse to the displacement direction of the conveyor track 330 to the collecting platform. The slide 340 may be designed as in the exemplary embodiments mentioned hereinabove.

Through the use of the rotation station, it is realized that this embodiment can be of compact construction.

It will be understood by anyone skilled in the art that within the framework of the invention, still many variants other than the embodiments described hereinabove are possible. Thus, it is for instance possible to design the provisions for bringing sods from the conveyor track onto the collecting platform without a stop, but with provisions for deflecting the direction of movement of the sods from the conveying direction to the collecting platform via a flowing path.

What is claimed is:

1. A sod-collecting apparatus, comprising
   a sod cutter head,
   a sod coiling device,
   a conveyor for transporting sods from the sod cutter head to the sod coiling device,
   a collecting platform for supporting juxtaposed rows of coiled sods,
   a feed conveyor for feeding coiled sods from the sod coiling device, and
   a conveyor belt downstream of said feed conveyor, said conveyor belt extending along the collecting platform, wherein the conveyor belt is arranged for displacing the coiled sods on the conveyor belt along the collecting platform in a direction parallel to an axial body axis of coiled sods located on the conveyor belt, with a positioning structure for stopping each individual sod on the conveyor belt in at least one predetermined position along the collecting platform.

2. An apparatus according to claim 1, wherein the positioning structure is provided with at least two stops in different positions along said conveyor belt, said stops each defining one of said predetermined positions.

3. An apparatus according to claim 1, wherein the positioning structure comprises a control connected to the conveyor belt, said control being arranged for moving the conveyor belt up to the predetermined position.

4. An apparatus according to claim 1, further comprising rotation means for rotating coiled sods from a feed orientation to an orientation wherein an axial axis of the coiled sods is directed in a conveying direction of the conveyor belt.

5. An apparatus according to claim 1, wherein the feed conveyor is directed substantially perpendicularly to a conveying direction of the conveyor belt.

6. An apparatus according to claim 1, wherein the predetermined position is determined by a stop located in an stop position above the conveyor belt.

7. An apparatus according to claim 1, further comprising displacing means arranged for displacing coiled sods from the predetermined position on the conveyor belt to the collecting platform in a direction transverse to the conveying direction of the conveyor belt.

8. An apparatus according to claim 7, wherein the displacing means comprise at least one slide.

9. An apparatus according to claim 8, wherein the at least one slide extends substantially over the width of the collecting platform, and is arranged for each time displacing a plurality of positioned sods.

10. An apparatus according to claim 7, wherein the displacing means comprise at least two slides which are movable in a direction transverse to the conveying direction of the conveyor belt.

11. An apparatus according to claim 1, wherein the feed conveyor is arranged for simultaneously feeding at least two coiled sods.

12. An apparatus according to claim 1, wherein the conveyor belt comprises a smooth conveyor belt.

13. An apparatus according to claim 1, wherein the collecting platform comprises a smooth conveyor belt.

14. An apparatus according to claim 1, wherein the collecting platform has at least one side thereof provided with a movable compression member.

15. A sod-collecting apparatus, comprising
   a collecting platform for supporting juxtaposed rows of coiled sods,
   a feed conveyor for feeding coiled sods from the sod coiling device,
   a conveyor belt downstream of said feed conveyor, said conveyor belt extending along the collecting platform, wherein the conveyor belt is arranged for displacing the coiled sods on the conveyor belt along the collecting platform in a direction parallel to an axial body axis of coiled sods located on the conveyor belt, with a positioning structure for stopping each individual sod on the conveyor belt in at least one predetermined position along the collecting platform,
   displacing means arranged for displacing coiled sods from the predetermined position on the conveyor belt to the collecting platform in a direction transverse to the conveying direction of the conveyor belt, the displacing means comprising at least two slides which are movable in a direction transverse to the conveying direction of the conveyor belt, and wherein the displacing means comprise respective stops for each of the at least two slides.

16. An apparatus according to claim 15, wherein at least one of the stops is movable between a stop position and a retracted position.

17. A sod-collecting apparatus, comprising a sod cutter head, a sod coiling device, a conveyor for transporting sods from the sod cutter head to the sod coiling device, a collecting platform for supporting juxtaposed rows of coiled sods, a feed conveyor for feeding coiled sods from the sod coiling device, and a conveyor belt downstream of said feed conveyor, said conveyor belt extending along the collecting platform, wherein the conveyor belt is arranged for displacing coiled sods on the conveyor belt along the collecting platform in a direction parallel to an axial body axis of coiled sods located on the conveyor belt, with a positioning structure for stopping each individual sod on the conveyor belt in at least one predetermined position along the collecting platform, the positioning structure being provided with at least two stops in different positions along said conveyor belt, said stops each defining one of said predetermined positions.

18. A sod-collecting apparatus, comprising a sod cutter head, a sod coiling device, a conveyor for transporting sods from the sod cutter head to the sod coiling device, a collecting platform for supporting juxtaposed rows of coiled sods, a feed conveyor for feeding coiled sods from the sod coiling device, and a conveyor belt downstream of said feed conveyor, said conveyor belt extending along the collecting platform, wherein the conveyor belt is arranged for displacing the coiled sods on the conveyor belt along the collecting platform in a direction parallel to an axial body axis of coiled sods located on the conveyor belt, with a positioning structure for stopping each individual sod on the conveyor belt in at least one predetermined position along the collecting platform, the positioning structure comprising a control connected to the conveyor belt, said control being arranged for moving the conveyor belt to the predetermined position.

* * * * *